US011268800B2

(12) United States Patent
Van Hauth

(10) Patent No.: US 11,268,800 B2
(45) Date of Patent: Mar. 8, 2022

(54) METHOD FOR CALIBRATING A MEASURING PROBE IN A GEAR CUTTING MACHINE

(71) Applicant: LIEBHERR-VERZAHNTECHNIK GMBH, Kempten (DE)

(72) Inventor: Johannes Van Hauth, Kempten (DE)

(73) Assignee: LIEBHERR-VERZAHNTECHNIK GMBH, Kempten (DE)

(*) Notice: Subject to any disclaimer, the term of this patent is extended or adjusted under 35 U.S.C. 154(b) by 123 days.

(21) Appl. No.: 16/802,461

(22) Filed: Feb. 26, 2020

(65) Prior Publication Data

US 2020/0271432 A1 Aug. 27, 2020

(30) Foreign Application Priority Data

Feb. 26, 2019 (DE) .................... 10 2019 104 891.5

(51) Int. Cl.
*G01B 5/20* (2006.01)
*B23F 1/06* (2006.01)
*G01B 5/00* (2006.01)

(52) U.S. Cl.
CPC ............. *G01B 5/202* (2013.01); *B23F 1/06* (2013.01); *G01B 5/0004* (2013.01)

(58) Field of Classification Search
None
See application file for complete search history.

(56) References Cited

U.S. PATENT DOCUMENTS

| 4,062,125 A * | 12/1977 | Maag ................ G01B 5/0002 33/501.14 |
| 4,498,335 A * | 2/1985 | Thoma ............. G01M 13/021 33/501.9 |
| 5,461,797 A * | 10/1995 | Royer ................. G01B 5/202 33/501.14 |
| 6,460,261 B1 * | 10/2002 | Noda .................. G01B 5/241 33/199 R |

(Continued)

FOREIGN PATENT DOCUMENTS

| CN | 101886921 A | 11/2010 |
| DE | 102013003585 A1 | 9/2014 |

(Continued)

*Primary Examiner* — Christopher W Fulton
(74) *Attorney, Agent, or Firm* — McCoy Russell LLP

(57) ABSTRACT

The present application discloses a method for calibrating a measuring probe in a gear cutting machine by using a workpiece received in a workpiece holder of the gear cutting machine, wherein the measuring probe includes a measuring probe tip which is movably arranged on a measuring probe base, wherein the deflection of the measuring probe tip relative the measuring probe base can be determined via at least one sensor of the measuring probe, and wherein the measuring probe is traversable relative to the workpiece holder via at least two axes of movement of the gear cutting machine. The method comprises rotating the workpiece via an axis of rotation of the workpiece holder and traversing the measuring probe via the at least two axes of movement of the gear cutting machine such that in the case of a perfect calibration the touch point of the measuring probe tip on the tooth flank would remain unchanged.

15 Claims, 7 Drawing Sheets

(56) References Cited

U.S. PATENT DOCUMENTS

| | | | |
|---|---|---|---|
| 6,886,264 B2* | 5/2005 | Sakata | G01B 7/12 33/502 |
| 8,132,335 B2* | 3/2012 | Dreier | G01B 21/042 33/502 |
| 8,931,336 B2* | 1/2015 | Winkel | B23F 23/1218 73/162 |
| 8,991,246 B2* | 3/2015 | Hirono | G01B 5/202 73/162 |
| 11,059,116 B2* | 7/2021 | Wurfel | B23Q 17/0914 |
| 2003/0113177 A1* | 6/2003 | Fahrer | B23F 23/10 409/51 |
| 2010/0292946 A1* | 11/2010 | Tamai | G01B 21/042 702/94 |

FOREIGN PATENT DOCUMENTS

| | | |
|---|---|---|
| EP | 2554938 B1 | 9/2017 |
| JP | 2013011443 A | 1/2013 |

\* cited by examiner

METHOD FOR CALIBRATING A MEASURING PROBE IN A GEAR CUTTING MACHINE

CROSS-REFERENCE TO RELATED APPLICATION

The present application claims priority to German Application No. DE 10 2019 104 891.5 entitled "METHOD FOR CALIBRATING A MEASURING PROBE IN A GEAR CUTTING MACHINE," filed on Feb. 26, 2019. The entire contents of the above listed application are hereby incorporated by reference for all purposes.

TECHNICAL FIELD

This invention relates to a method for calibrating a measuring probe in a gear cutting machine with the aid of a workpiece, in particular a gear wheel.

BACKGROUND AND SUMMARY

In gear cutting machines in which a measuring probe is installed in order to be able to check the produced workpieces in the machine (e.g.: tooth thickness check, pitch check, profile check, flank line check) external influences such as temperature fluctuations can lead to minimal deformations in the machine, which make these checks imprecise. The resulting changes in the position of the measuring probe relative to the toothing (hereinafter only referred to as position of the measuring probe) therefore must be determined regularly and be compensated by calibration in order to be able to ensure constantly good test results.

The difference of the assumed and the actual position of the measuring probe here is referred to as position error. When the position error is zero, the measuring probe is perfectly calibrated. The correction of the position of the measuring probe determined by the described method of the invention is referred to as position correction.

The determination of the position of the measuring probe necessary for the calibration can be carried out on a measurement object, for example on a measurement block. The determination directly on a workpiece clamped in the machine, in particular on a gear wheel, however involves certain advantages. In particular, the expenditure for the worker to incorporate a measurement block into the machine and remove the same again after the calibration is eliminated. In gear cutting machines for producing large workpieces it can also be possible that the traversing paths for the measuring probe are not sufficient to be able to reach a measurement block. This is also avoided by a measurement on the workpiece.

From the document EP 2 554 938 B1 there is known a method for calibrating a measuring probe in a gear cutting machine with the aid of a workpiece, in which the profile of the workpiece is determined twice by different measurement steps. In the first measurement step the measuring probe is traversed in a tangential direction, while the workpiece is rotated, but in the second measurement step it is traversed in a non-tangential direction or radially. With reference to a difference between tooth profile gradient errors determined in the respective measurement steps, a position error of the measuring head is determined and used for the calibration.

It is the object of the present invention to provide an improved method for calibrating a measuring probe in a gear cutting machine with the aid of a workpiece.

In a first aspect, the present invention comprises a method for calibrating a measuring probe in a gear cutting machine by using a workpiece received in a workpiece holder of the gear cutting machine, wherein the measuring probe includes a measuring probe tip which is movably arranged on a measuring probe base, wherein the deflection of the measuring probe tip relative the measuring probe base can be determined via at least one sensor of the measuring probe, and wherein the measuring probe is traversable relative to the workpiece holder via at least two axes of movement of the gear cutting machine,
the method comprising the following steps:
traversing measuring probe and/or workpiece into a relative position in which the measuring probe tip touches a tooth flank of the workpiece;
rotating the workpiece via an axis of rotation of the workpiece holder and traversing the measuring probe via the at least two axes of movement of the gear cutting machine such that
the touch point of the measuring probe tip on the tooth flank would remain unchanged in the case of a perfect calibration, and
the deflection or the amount of the deflection of the measuring probe tip would adopt and/or maintain at least one specified value in the case of a perfect calibration;
determining a deviation of the deflection of the measuring probe tip from the at least one specified value at at least one measurement point;
determining at least one correction value of the calibration on the basis of the deviation.

According to a second aspect, the present invention comprises a method for calibrating a measuring probe in a gear cutting machine by using a workpiece received in a workpiece holder of the gear cutting machine, wherein the measuring probe has a measuring probe tip which is movably arranged on a measuring probe base, wherein the deflection of the measuring probe tip relative the measuring probe base and/or the achievement of a deflection of the measuring probe tip relative to the measuring probe base can be determined via at least one sensor of the measuring probe, and wherein the measuring probe is traversable relative to the workpiece holder via at least two axes of movement of the gear cutting machine,
the method comprising the following steps:
traversing measuring probe and/or workpiece into a relative position in which the measuring probe tip touches the tooth flank of the workpiece;
rotating the workpiece via an axis of rotation of the workpiece holder and traversing the measuring probe via the at least two axes of movement of the gear cutting machine such that
the touch point of the measuring probe tip on the tooth flank would remain unchanged in the case of a perfect calibration, and
the deflection or the amount of the deflection of the measuring probe tip adopts and/or maintains at least one specified value;
determining a deviation between the actual position of the axis of rotation of the workpiece holder and/or the at least two axes of movement of the gear cutting machine from a position which the same would have in the case of a perfect calibration, at at least one measurement point; and
determining at least one correction value of the calibration on the basis of the deviation.

In both aspects according to the present invention, other than in EP 2 554 938 B1, no profile angles and/or profile angle deviations are measured. Furthermore, no movement of the measuring probe tip tangentially to the base circle is performed. Rather, the center of the measuring probe tip (possibly except for the measured deviations) moves on a circular path. As a result a considerably simpler method is provided, which also allows a more comprehensive calibration.

Preferred embodiments of the method according to the first aspect and according to the second aspect will be described in detail below. Unless otherwise indicated, the preferred embodiments can be used for developing both aspects.

Preferably, the present invention can do without a reference object such as a reference measurement block, i.e. the calibration is made exclusively via the toothed workpiece.

The toothing of the workpiece can be chosen arbitrarily. In particular, the toothing of the workpiece can be a straight or a helically toothed internal or external toothing which can be of both cylindrical and conical design (beveloid toothing). The toothing can be both symmetrical and asymmetrical, i.e. the profile angles of the left and right flanks can, but need not be different. The profile of the toothing can be chosen arbitrarily, in particular also as an involute.

The calibration method according to the invention preferably is performed fully automatically in a production cycle.

In the method according to the first aspect, there is used a measuring probe which is able to provide the deflection of the measuring probe tip to a control unit, i.e. is suitable for a scanning measurement.

For carrying out a method according to the second aspect, on the other hand, there can also be used a measuring probe which merely can output the achievement of a particular deflection of the measuring probe tip relative to the measuring probe base, i.e. only is suitable for a switching measurement.

According to the invention, there can be used measuring probes which can only output the amount of the deflection (in switching probes: which can only output whether a contact exists). However, there can also be used measuring probes which in addition can also output the tilting direction. This information, however, is not absolutely necessary.

According to a possible embodiment of the present invention, the deviation is determined for a plurality of measurement points, and the at least one correction value is determined on the basis of the plurality of deviations. In particular, a curve of the deviations can be determined over a plurality of measurement points.

According to a possible embodiment of the present invention, the deviation and/or the curve of the deviations is compared with a plurality of theoretical deviations determined for different calibration errors and/or theoretical curves of the deviations in order to determine at least one correction value of the calibration.

According to a possible embodiment of the present invention, a deviation in contact with a first flank of the workpiece is determined in at least one first measurement run, and a deviation in contact with a second, preferably opposite flank of the workpiece is determined in at least one second measurement run. Preferably, the deviation is determined for both flanks on several measurement points each. Due to the measurement on two flanks, additional information is available for the calibration.

According to a possible embodiment of the present invention, correction values are determined for at least two directions of movement and/or axes of movement, wherein the directions of movement and/or axes of movement preferably allow a movement in a plane perpendicular to the axis of rotation of the workpiece holder. Preferably, at least two measurement runs are carried out therefor, in each of which the deviation is determined.

As compared to the prior art, there is obtained the advantage that by means of two measurements not only an error in a first direction, but also an error in a second direction can be corrected. The two calibration paths preferably are arranged on two different flank sides.

According to a possible embodiment of the present invention rotating the workpiece is effected via the axis of rotation of the workpiece holder, and traversing the measuring probe is effected via the at least two axes of movement of the gear cutting machine at the same time and/or continuously. In particular, such a procedure can be employed when the measuring probe can output the deflection of the measuring probe tip relative to the measuring probe base.

According to another possible embodiment of the present invention rotating the workpiece is effected via the axis of rotation of the workpiece holder, and traversing the measuring probe is effected via the at least two axes of movement of the gear cutting machine alternately and/or intermittently. Such a method preferably is employed when the measuring probe merely can output the achievement of a deflection of the measuring probe tip relative to the measuring probe base, i.e. is suitable only for a switching measurement.

According to a possible embodiment of the present invention, a change in the allowance on the flank and/or the profile of the flank is determined by tracing the flank to be checked, in order to previously select a touch point for the calibration and/or to take account of the change in the allowance and/or of the profile around the touch point when determining the correction value. In particular, there can be chosen a touch point in which the change in the allowance on the flank is as small as possible so that the deviations from a target geometry on which the calculations are based are as small as possible.

According to a possible embodiment of the present invention, a radius on which the touch point is located and/or a range of angles of rotation of the axis of rotation of the workpiece holder, which is traced, is determined in dependence on a profile of the workpiece and/or constraints of the gear cutting machine and/or the measuring probe. In particular, the determination is effected such that the measurement can be effected over a range of angles of rotation as large as possible and/or with a specified accuracy.

According to a possible embodiment of the present invention, the measuring probe tip has the shape of a sphere.

According to a possible embodiment of the present invention, the gear cutting machine comprises a machining head which is traversable relative to the workpiece holder via the at least two axes of movement, wherein the measuring probe and a tool holder are arranged on the machining head. The axes of movement of the machining head therefore can also be used for traversing the measuring probe.

In a possible embodiment of the present invention, the measuring probe can, however, also wholly or partly be traversable via other axes of movement than the machining head including the tool holder.

According to a possible embodiment of the present invention, the at least two axes of movement are linear axes. Preferably, the same allow a movement in a plane which is perpendicular to the axis of rotation of the workpiece holder. Preferably, both axes of movement are calibrated by the method of the invention.

The present invention furthermore comprises a gear cutting machine with a workpiece holder for receiving a workpiece and with a measuring probe, wherein the measuring probe includes a measuring probe tip which is movably arranged on a measuring probe base, wherein the deflection of the measuring probe tip relative the measuring probe base and/or the achievement of a deflection of the measuring probe tip relative to the measuring probe base can be determined via at least one sensor of the measuring probe, and wherein the measuring probe is traversable relative to the workpiece holder via at least two axes of movement of the gear cutting machine, The gear cutting machine includes a control unit which is configured to calibrate the measuring probe by a method as it has been described above.

In particular, the control unit includes a microprocessor and a non-volatile memory in which a program is stored. When the program runs on the microprocessor, the gear cutting machine performs the method of the invention. The control unit therefor can actuate the axes of movement of the gear cutting machine and/or evaluate signals and/or measurement data of the measuring probe.

According to a possible embodiment of the invention, the control unit is configured such that the method is performed fully automatically as part of a production cycle.

BRIEF DESCRIPTION OF THE FIGURES

The present invention will now be described in detail with reference to Figures and exemplary embodiments.

In the drawings.

DETAILED DESCRIPTION

Figure 7:
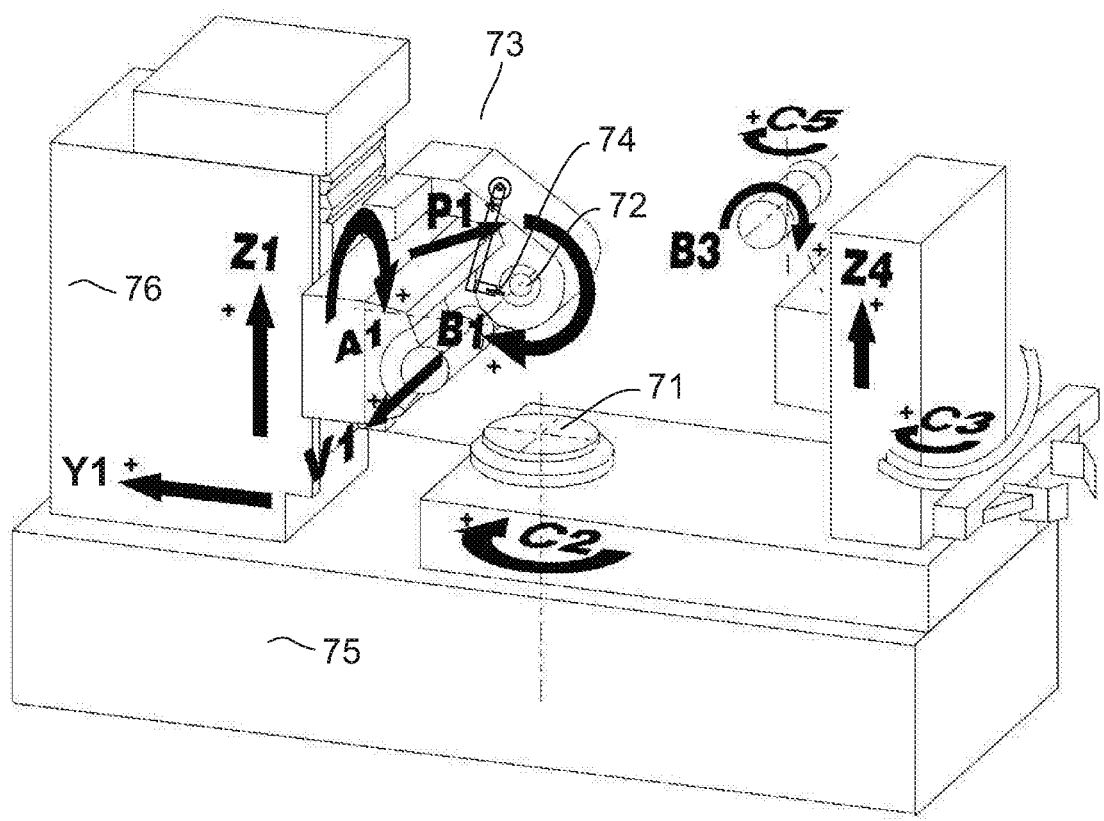
FIG. 7: shows an exemplary embodiment for the construction and the mode of operation of a gear cutting machine according to the invention.
Figure 8:
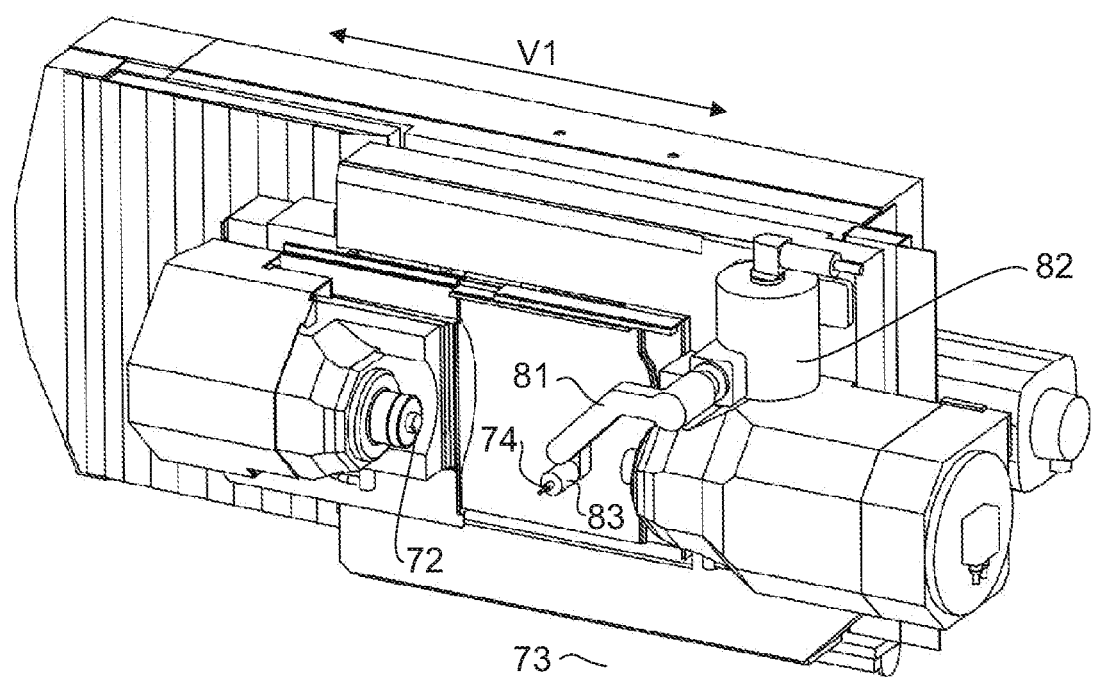
FIG. 8: shows an exemplary embodiment for a machining head with a measuring probe, which is used in a gear cutting machine.

An exemplary embodiment for the construction and the mode of operation of a gear cutting machine according to the invention is shown in FIG. 7. FIG. 8 shows an exemplary embodiment for a machining head 73 with a measuring probe 74, which can be used in the gear cutting machine.

In the exemplary embodiment, the gear cutting machine comprises a workpiece holder 71 and a tool holder 72. The workpiece and tool holders can be driven about their axes of rotation C2, B1 via corresponding drives.

The tool holder is arranged on a machining head 73 which is traversable relative to the workpiece holder via axes of movement. In the exemplary embodiment a first linear axis Y1 is provided, via which the tool holder 72 is traversable in a direction which is perpendicular to the axis of rotation C2 of the workpiece holder in order to change the center distance. Furthermore, a second linear axis Z1 is provided, via which the tool holder 72 is traversable in a direction which is parallel to the axis of rotation C2 of the workpiece holder. Furthermore, a third linear axis V1 is provided, via which the tool holder 72 is traversable in a direction parallel to its own axis of rotation B1. The alignment of the linear axis V1 and the tool holder 72 can be changed via a pivot axis A1 which extends parallel to the Y1-axis.

In the exemplary embodiment, the workpiece holder 71 is arranged on a tool table 75. The tool table 75 carries a tool stand 76 which is linearly traversable by means of the Y1-axis. On the tool stand a carriage traversable via the axis Z1 is arranged, on which the machining head with the tool holder 72 is arranged via the A1-axis and the V1-axis.

The gear cutting machine for example can be a gear hobbing machine and/or a hob grinding machine. The present invention, however, can also be used for any other gear cutting machines.

FIG. 8 shows an exemplary embodiment for the machining head 73. On the same, a measuring probe 74 is arranged. The same includes a measuring probe base 83, wherein the deflection of a measuring probe tip of the measuring probe 74 relative to the measuring probe base 83 can be determined via at least one sensor.

Via the measuring probe base 83, the measuring probe 74 is arranged on a swivel arm 81 which via a drive 82 is pivotable from a rest position into a measuring position and back.

Figure 1:
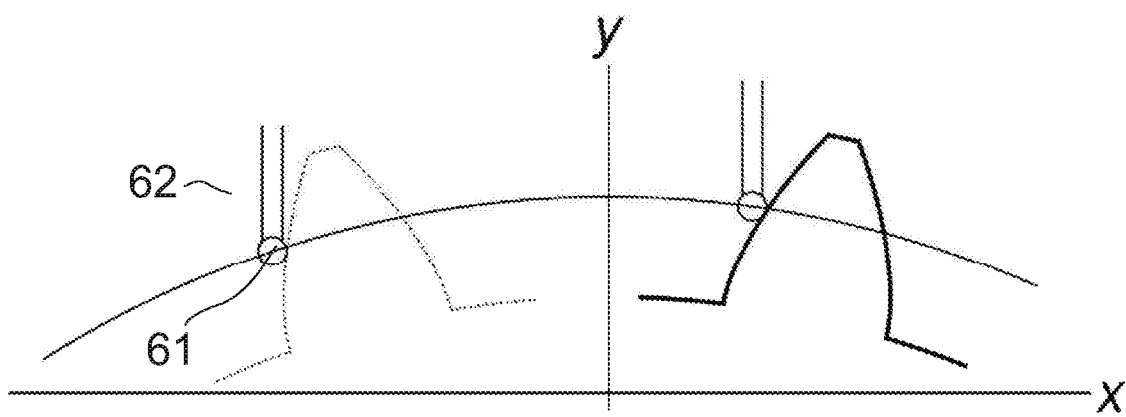
FIG. 1: shows a schematic diagram of an exemplary embodiment of the method according to the invention, which shows the circular path along which the touch point between measuring probe tip and tooth flank will extend in the case of a rotation of the workpiece axis of rotation and a synchronous traversal of the measuring probe.

The definition of the directions X, Y and Z chosen in accordance with the present description can also be taken from FIG. 1, wherein Z is orthogonal to X and Y so that the three axes form a right-handed system. The Z-axis extends parallel to the axis of rotation of the toothing (workpiece axis of rotation). The C2-axis here designates an axis of rotation of the workpiece holder, which rotates the workpiece about the workpiece axis of rotation. The X-, Y- and Z-axes designate machine axes which traverse the measuring probe relative to the toothing in the directions X, Y and Z. The axes need not necessarily be physical axes. The movements can also be realized by interpolation of two or more axes.

In particular, a movement in the Y-direction can be realized in the exemplary embodiment via the Y1-direction, a movement in the X-direction can be realized in the exemplary embodiment at a position of the A1-axis in which the V1-axis is parallel to the X-direction, via the V1-axis alone, and in other positions by a superposition of movements of the V1-axis and the Z1-axis. In alternative embodiments of the gear cutting machine, however, there can also be provided an X1-axis which always is aligned parallel to the X-direction, e.g. when the X1-axis carries the A1-axis and therefore is not pivoted by the same.

Figure 6:
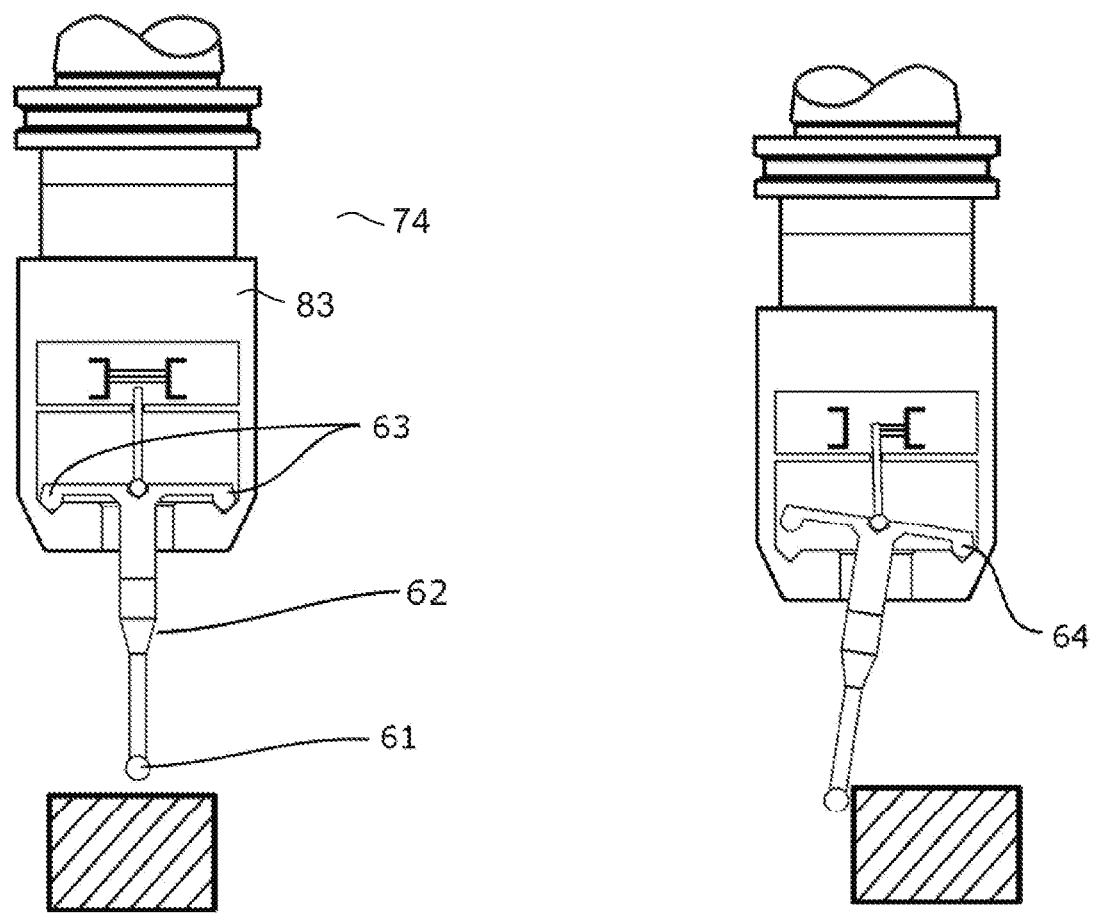
FIG. 6: shows an exemplary embodiment for the construction and the mode of operation of a measuring probe.

The measuring probe tip 61 at the end of the tracer pin 62 of the measuring probe 74 preferably is a sphere (measuring probe sphere), e.g. a ruby sphere. FIG. 6 shows the construction of a possible variant of a scanning measuring probe usable here.

In the method according to the invention there is preferably used a measuring probe which is suitable for a scanning measurement. In other words, a measuring probe which is able to provide the deflection of the tracer pin and/or the measuring probe tip to a control unit. A variant of the invention also provides to rather use a measuring probe which merely is suitable for a switching measurement. Furthermore, measuring probes can be distinguished by the question whether the same can output only the amount of the deflection (in switching probes: whether the same can only output whether a contact exists) or also the tilting direction. The method presented here can also be carried out with measuring probes which are not able to output the tilting direction. In the following, the method will be described for such a measuring probe.

In a first exemplary embodiment the basic sequence of the method is as follows:

The measuring probe tip is moved into a gap of the toothing to a specified depth (e.g.: center of the profile).

Then, the workpiece axis of rotation is rotated until the tracer pin reaches the desired deflection, i.e. preferably such that it has reached half of the possible deflection. This situation is shown on the right in FIG. 1.

Then, the workpiece axis of rotation is rotated continuously, and the X-, Y- and Z-axes are synchronously traversed such that, in case a perfect calibration has been made, the touch point of the measuring probe tip on the tooth flank and also the amount of the probe deflection remains the same, see FIG. 1. The touch point between measuring probe tip and toothing moves on a circular path whose center lies on the axis of rotation of the toothing.

During this rotation, the deflection of the tracer pin is recorded over the C-angle of rotation at several discrete points, in particular at as many discrete points as possible.

Figure 2:
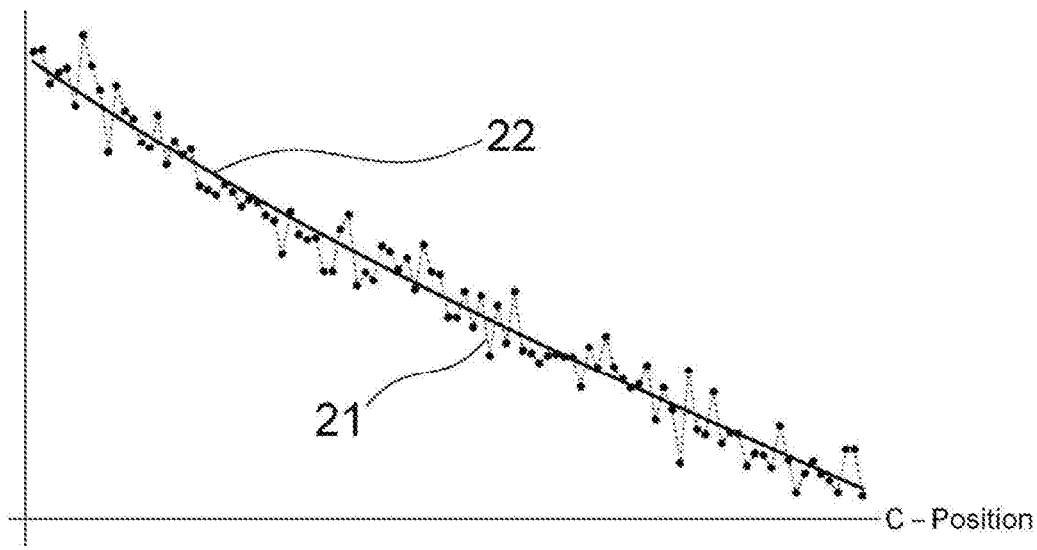
FIG. 2: shows an example for a measured (21) and a calculated (22) course of the recording of the probe deflection during a calibration measurement on the left flank, plotted over the workpiece angle of rotation.
Figure 3:
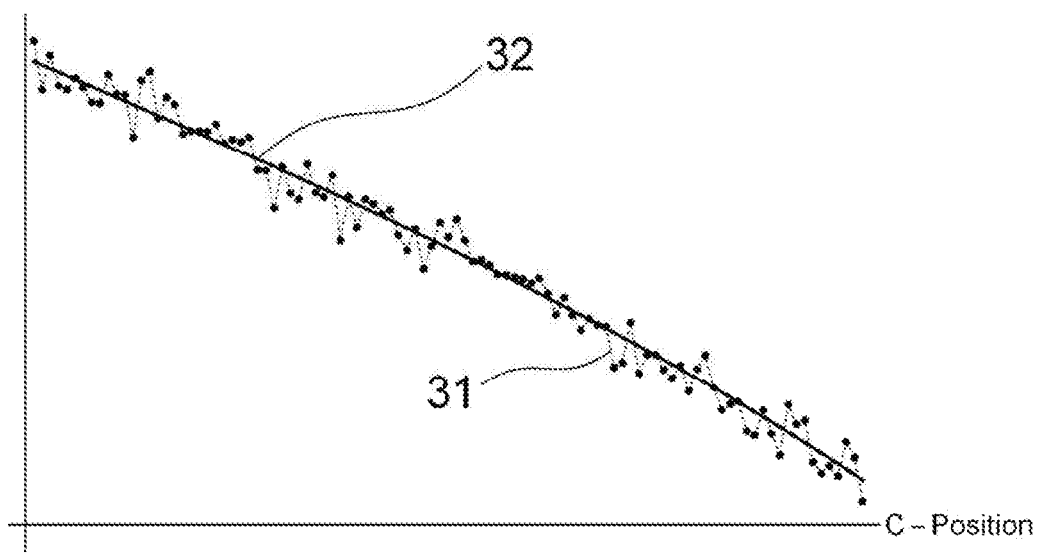
FIG. 3: shows an example for a measured (31) and a calculated (32) course of the recording of the probe deflection during a calibration measurement on the right flank, plotted over the workpiece angle of rotation.
Figure 4:
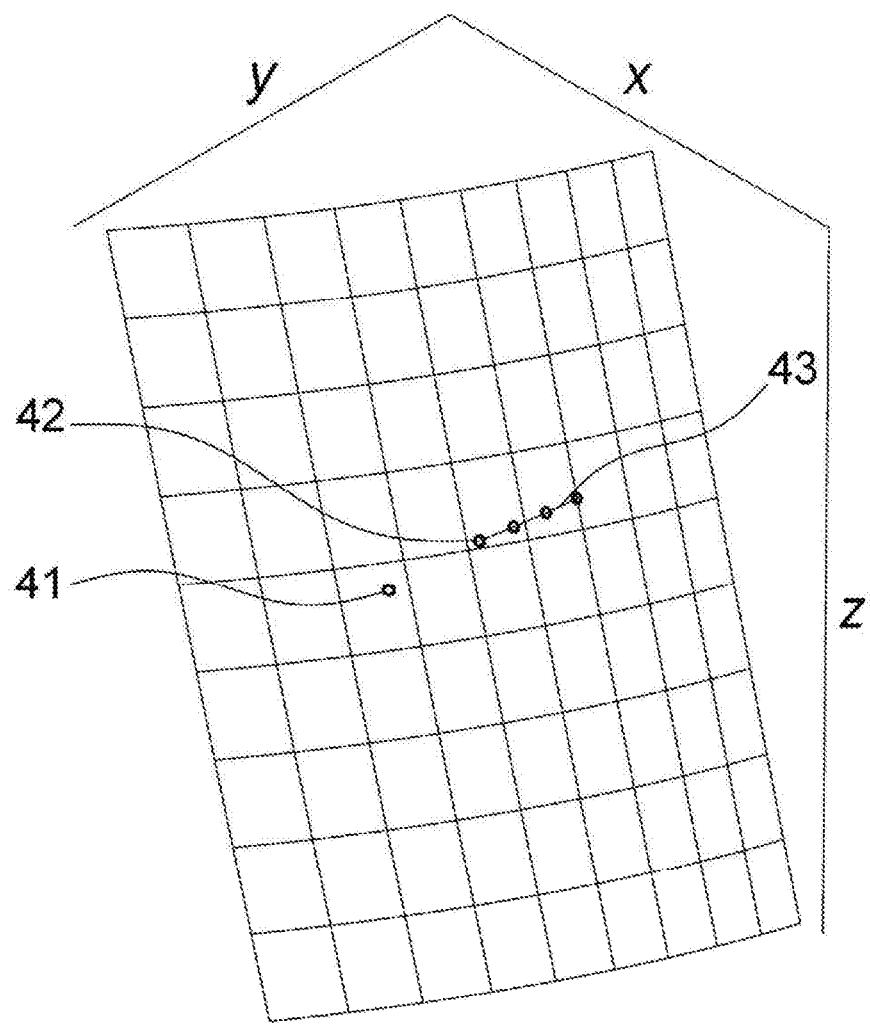
FIG. 4: shows a schematic diagram of the calculated touch point (41) and of the actual course of the touch point in the presence of a position error (43) of the measuring probe tip with the tooth flank.

This procedure is repeated for the other flank side so that a deflection recording for a point on a left flank and a deflection recording for a point on a right flank is obtained. Examples for such recordings are shown in FIG. 2 for the left flank (curve 21) and in FIG. 3 for the right flank (curve 31).

If a perfect calibration has been made and both the measuring probe and the machine axes have no inaccuracies, the recorded deflections of the probe for all C-positions for the two flanks each are constant at the respective probe starting deflection. The touch point of the measuring probe tip with the two flanks remains unchanged.

If no perfect calibration has been made, the actual touch point of the measuring probe tip on the flank at the beginning of the measurement (42) does not correspond to the calculated touch point (41). The calculated C-angle, which was assumed at the beginning of the measurement, when the desired deflection of the tracer pin is reached, thereby is not reached exactly. Moreover, when traversing the calculated kinematic paths (43), the deflection of the tracer pin and the touch point on the flank are changed. When plotting the deflection of the tracer pin via the C-position, one curve each is obtained for both flanks. These curves subsequently are referred to as deflection curves and are depicted in FIG. 2 for the left flank and in FIG. 3 for the right flank, by way of example. In general, these recorded deflection curves are provided with a certain noise, which results from an inaccuracy of the measuring probe and the machine axes.

With the aid of the calculated axial paths and a chain of coordinate transformations, it can be calculated and/or simulated how the deflection curves look like for a specified error in the X- and Y-direction and for specified angular deviations of the two C-start positions. In doing so, the previously calculated X-, Y- and Z-positions are used and the error is added in the X- and Y-direction. Moreover, a C-angle correction each is added for both paths. Then, the deflection of the tracer pin is calculated with the aid of a corresponding coordinate transformation. The touch point also is unknown. In this way, an array of curves is obtained for the deflection on the left and right flanks, wherein the error in the X- and Y-direction as well as the C-angle corrections on the left and right flanks are the free parameters of this array of curves.

There is used a standard which indicates the distance of how far the calculated deflection curves [22/32] for the left and the right flank are away from the recorded deflection curves [21/31] for the right and the left flank. A useful standard for example is the Lp-standard (or a discretized form thereof). By applying a compensation calculation, the deflection curves for the left and the right flank can be found from the array of curves (and thus also the errors in the X- and Y-direction), which best approximate the recorded deflection curves.

For this purpose, the minimum of this standard is searched for with a variation of the specified error in the X- and Y-direction and of the C-angle corrections. This can be realized via a numerical optimization method (e.g. a gradient method or a Newton method with discrete derivatives. In the curves 22 and 23 shown in FIG. 2 and FIG. 3, those curves from the array of curves are depicted at which this minimum is reached.

When no probe inaccuracies are present and the gear wheel is fabricated exactly in the environment around the touch points of the right and left flanks, the calculated error in the X- and Y-direction corresponds to the negative of the desired position correction, hence to the correction values for calibrating the measuring probe.

Alternatively, instead of a probe starting deflection constant over the measuring operation, on which the calculation of the movements made is based, a specified course of the probe deflection might also be used.

In a second exemplary embodiment on the other hand there can also be used a measuring probe which merely is suitable for a switching measurement, i.e. from a firmly specified deflection the measuring probe switches from the state "no contact" to the state "contact".

With such a measuring probe the procedure can be similar to the method described above:

In small steps, the position of the measuring probe tip is alternately changed and the workpiece then is rotated, until contact is made.

The change in position of the measuring probe tip is realized by traversing the X-, Y- and Z-axes such that in case a perfect calibration has been made, the touch point of the measuring probe tip on the tooth flank remains the same, when the workpiece axis of rotation is rotated by a firmly specified angular difference. The corresponding calculation is made analogously to the above description.

When no perfect calibration has been made, the specified angular difference does not correspond to the angular difference covered until the probe has made contact. The difference of these angular differences is recorded for a measurement on the left flank and a measurement on the right flank over the C-position.

Now, an array of curves can be simulated for the angular differences in dependence on the error in the X- and the Y-position and the C-angle corrections at first contact on the left and right flanks. The parameters are determined therefrom so that a minimum to the recording of the measured angular difference recording is reached. The correction value in turn is determined therefrom.

Alternatively, the workpiece might also be rotated alternately and then the position of the measuring probe tip might be tracked until contact is made. In this case the positions of the probe, in which the same has made contact, can be recorded and evaluated.

In both variants of the method of the invention the following further aspects are to be considered:

The range of C-positions, which can be used in the calibration, is limited by the following factors:

a. For a specified C-angle, the angle $\alpha\_NT$ between the normal to the tooth flank at the touch point of the measuring probe tip and the tracer pin can be calculated. When $\alpha\_NT$ exceeds 90°, collisions of the tracer pin and the flank at which the calibration is made can occur. Depending on the measuring probe there is a lower limit for $\alpha\_NT$, from which the measurement becomes imprecise. From the limits of the range for $\alpha\_NT$, limits for the C-range can be calculated.

b. There may be limitations on how far the measuring probe can be traversed in the X-direction for a concrete machine. This results in limitations on how far the workpiece axis of rotation can be rotated.

c. It can occur that the tracer pin collides with the tooth flank opposite the measurement. The C-range hence must be chosen such that this will not happen.

All the above-mentioned restrictions for the C-range of the calibration depend on how the depth and/or the radius on which the touch point between tooth flank and measuring probe tip lies is specified. The larger the C-range crossed over during the calibration, the less probe inaccuracies will become noticeable in the position correction. Hence, a step can be provided before the kinematic calculation, in which it is calculated for what radius the C-range is largest, and thus a suitable radius is selected.

When determining how the deflection curves for a specified error in the X- and Y-direction and for specified angular deviations of the two C-start positions look like, it is also calculated how the touch point on the flank is changed (43), and it must be assumed that the given toothing is produced exactly. The larger the position error, the larger the movement of the touch point of the measuring probe tip with the flank. The more precisely the toothing in the environment around the calculated touch point is produced, the better is the calculated calibration correction.

Therefore, in a possible embodiment a preceding step can include searching for a point in which the change of the allowance on the flank is as small as possible in a small environment around the measurement point on the flank by tracing the flank or the profile of the flank to be checked.

Figure 5:
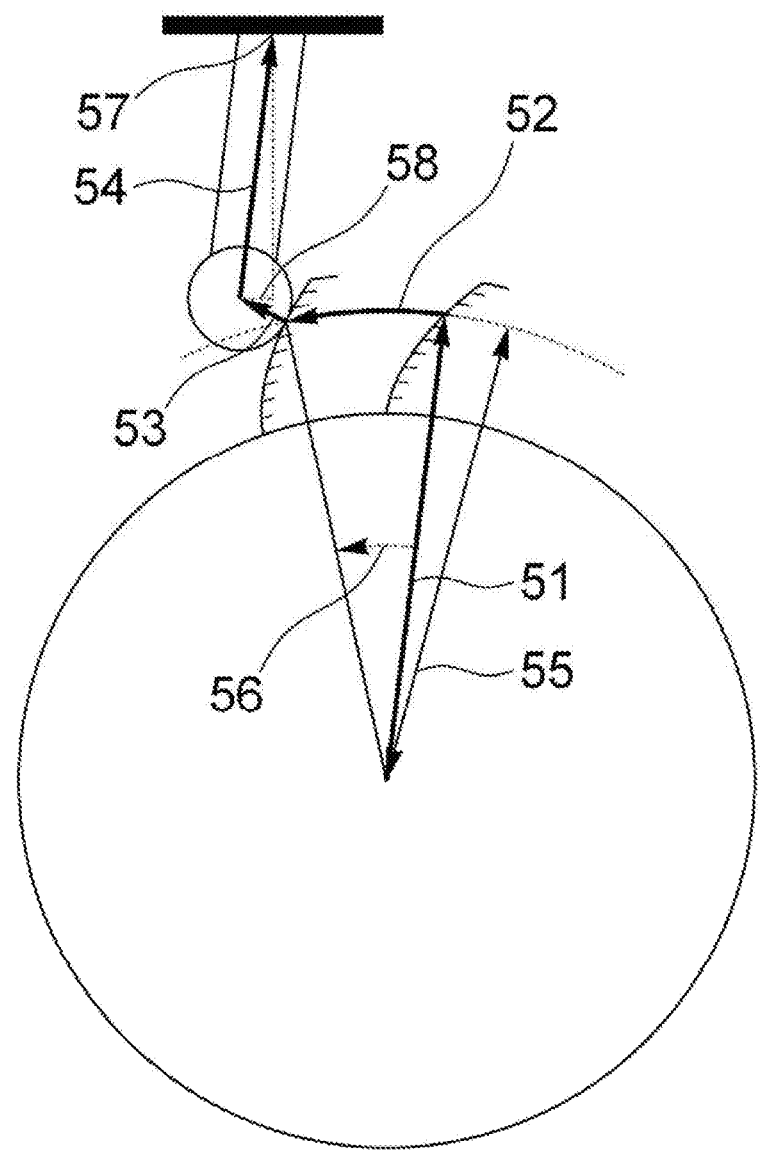
FIG. 5: shows a schematic diagram of a chain of transformations (51-54) for calculating the position of the measuring probe.

Depending on the kind of toothing and the construction of the measuring probe, its change of the movable parts can be depicted by a chain of coordinate transformations (51-54), as this is shown in FIG. 5:

Depending on the kind of toothing and the desired radius (55) on which the measurement is to be made, the touch point of the measuring probe is determined. (For example via the equation of a circle involute) (Transformation 51)

in dependence on the C-position (56) the touch point is rotated. (Transformation 52)

From the touch point the center of the measuring probe tip is reached by a displacement around the radius of the measuring probe tip in the direction of the normal vector onto the tooth flank. (Transformation 53)

Depending on the construction of the measuring probe it can be determined how the X-, Y- and Z-axes, on which the measuring probe is mounted (57), are to be traversed so that the deflection of the tracer pin (58) is the desired deflection and the measuring probe tip has the desired position. (Transformation 54)

A more detailed analysis now is made for a concrete measuring probe shown in FIG. 6:

The tracer pin (62) rests on a face gear (63). Upon deflection of the tracer pin, the face gear tilts upwards on the side facing away from the touch (see FIG. 6, right-hand image). In the following, the plane in which this tilting takes place will be referred to as recoil plane. In the right-hand image of FIG. 6, this is the image plane. The fulcrum (64) and the alignment of the recoil plane depend on the direction of the deflection.

The associated transformation is composed of a displacement from the measuring sphere center to the tilting-direction-dependent fulcrum and another displacement towards the center of the face gear (mounting point of the tracer pin).

The measuring probe is constructed such that a spring always pushes the tracer pin back so that the same is deflected as little as possible. This results in the additional condition that the normal vector on the scanned surface at the touch point is perpendicular to the normal vector of the recoil plane.

This results in a further equation which must be resolved both when calculating the kinematic path and when calculating the deflection for a given position error.

Thus, in the calculation of the kinematic paths there are 4 equations for each C-position (3 equations from the coordinate transformations and the additional condition) and the 4 unknowns: X-, Y- and Z-position and tilting direction.

In the calculation of the deflection for a given position error, one has the same 4 equations for each C-position and resolves according to the two surface parametrization coordinates of the touch point on the tooth flank, the tilting direction and the deflection of the tracer pin.

The invention claimed is:

1. A method for calibrating a measuring probe in a gear cutting machine by using a workpiece received in a workpiece holder of the gear cutting machine, wherein the measuring probe includes a measuring probe tip which is movably arranged on a measuring probe base, wherein the deflection of the measuring probe tip relative the measuring probe base can be determined via at least one sensor of the measuring probe, and wherein the measuring probe is traversable relative to the workpiece holder via at least two axes of movement of the gear cutting machine, the method comprising the following steps:

traversing measuring probe and/or workpiece into a relative position in which the measuring probe tip touches a tooth flank of the workpiece;

rotating the workpiece via an axis of rotation of the workpiece holder and simultaneously traversing the measuring probe via the at least two axes of movement of the gear cutting machine such that, in the case of a perfect calibration, during the rotation of the workpiece and traversing of the measuring probe:

the touch point of the measuring probe tip on the tooth flank remains unchanged, and the deflection or the amount of the deflection of the measuring probe tip maintains a specified value;

determining a deviation of the deflection of the measuring probe tip from the at least one specified value at at least one measurement point; and determining at least one correction value of the calibration on the basis of the deviation.

2. The method according to claim 1, wherein the deviation is determined for a plurality of measurement points and the at least one correction value is determined on the basis of the plurality of deviations, and wherein a curve of the deviations is determined over the plurality of measurement points.

3. The method according to claim 1, wherein the deviation and/or the curve of the deviations is compared with a plurality of theoretical deviations determined for different calibration errors and/or theoretical curves of the deviations in order to determine at least one correction value of the calibration.

4. The method according to claim 1, wherein in at least one first measurement run a deviation in contact with a first flank of the workpiece and in at least one second measurement run a deviation in contact with a second, preferably opposite flank of the workpiece is determined.

5. The method according to claim 1, wherein correction values are determined for at least two directions of movement and/or axes of movement, wherein the directions of movement and/or axes of movement preferably allow a movement in a plane perpendicular to the axis of rotation of the workpiece holder.

6. The method according to claim 1, wherein rotating the workpiece is effected via the axis of rotation of the workpiece holder, and traversing the measuring probe is effected via the at least two axes of movement of the gear cutting machine at the same time and/or continuously.

7. The method according to claim 1, wherein rotating the workpiece is effected via the axis of rotation of the workpiece holder, and traversing the measuring probe is effected via the at least two axes of movement of the gear cutting machine alternately and/or intermittently.

8. The method according to claim 1, wherein in dependence on a profile of the workpiece and/or constraints of the gear cutting machine and/or the measuring probe a radius on which the touch point is located and/or a range of angles of rotation of the axis of rotation of the workpiece holder, which is traced, is determined.

9. The method according to claim 1, wherein the measuring probe tip has the shape of a sphere.

10. The method according to claim 1, wherein the gear cutting machine includes a machining head which is traversable relative to the workpiece holder via the at least two axes of movement, wherein the measuring probe and a tool holder are arranged on the machining head.

11. The method according to claim 1, wherein the at least two axes of movement are linear axes.

12. A gear cutting machine with a workpiece holder for receiving a workpiece and with a measuring probe, wherein the measuring probe includes a measuring probe tip which is movably arranged on a measuring probe base, wherein the deflection of the measuring probe tip relative the measuring probe base and/or the achievement of a deflection of the measuring probe tip relative to the measuring probe base can be determined via at least one sensor of the measuring probe, and wherein the measuring probe is traversable relative to the workpiece holder via at least two axes of movement of the gear cutting machine,
wherein the gear cutting machine includes a control unit which is configured to calibrate the measuring probe by a method according to claim 1.

13. The gear cutting machine according to claim 12, wherein the control unit is configured such that the method is executed fully automatically as part of a production cycle.

14. A method for calibrating a measuring probe in a gear cutting machine by using a workpiece received in a workpiece holder of the gear cutting machine, wherein the measuring probe includes a measuring probe tip which is movably arranged on a measuring probe base, wherein the deflection of the measuring probe tip relative the measuring probe base and/or the achievement of a deflection of the measuring probe tip relative to the measuring probe base can be determined via at least one sensor of the measuring probe, and wherein the measuring probe is traversable relative to the workpiece holder via at least two axes of movement of the gear cutting machine, the method comprising the following steps:
traversing measuring probe and/or workpiece into a relative position in which the measuring probe tip touches the tooth flank of the workpiece;
rotating the workpiece via an axis of rotation of the workpiece holder and simultaneously traversing the measuring probe via the at least two axes of movement of the gear cutting machine such that, in the case of a perfect calibration, during the rotation of the workpiece and traversing of the measuring probe:
the touch point of the measuring probe tip on the tooth flank remains unchanged, and
the deflection or the amount of the deflection of the measuring probe tip maintains a specified value;
determining a deviation between the actual position of the axis of rotation of the workpiece holder and/or the at least two axes of movement of the gear cutting machine from a position which the same would have in the case of a perfect calibration, at at least one measurement point; and
determining at least one correction value of the calibration on the basis of the deviation.

15. A method for calibrating a measuring probe in a gear cutting machine by using a workpiece received in a workpiece holder of the gear cutting machine, wherein the measuring probe includes a measuring probe tip which is movably arranged on a measuring probe base, wherein the deflection of the measuring probe tip relative the measuring probe base can be determined via at least one sensor of the measuring probe, and wherein the measuring probe is traversable relative to the workpiece holder via at least two axes of movement of the gear cutting machine, the method comprising the following steps:
traversing measuring probe and/or workpiece into a relative position in which the measuring probe tip touches a tooth flank of the workpiece;
rotating the workpiece via an axis of rotation of the workpiece holder and traversing the measuring probe via the at least two axes of movement of the gear cutting machine such that:
the touch point of the measuring probe tip on the tooth flank would remain unchanged in the case of a perfect calibration, and
the deflection or the amount of the deflection of the measuring probe tip would adopt and/or maintain at least one specified value in the case of a perfect calibration;
determining a deviation of the deflection of the measuring probe tip from the at least one specified value at at least one measurement point; and
determining at least one correction value of the calibration on the basis of the deviation,
wherein a change in the allowance on the flank and/or the profile of the flank is determined by tracing the flank to be checked, in order to previously select a touch point for the calibration and/or to take account of the change in the allowance and/or of the profile around the touch point when determining the correction value.

* * * * *